J. L. VAN WERT.
Hub for Wheels.
No. 111,703.  Patented Feb. 7, 1871.
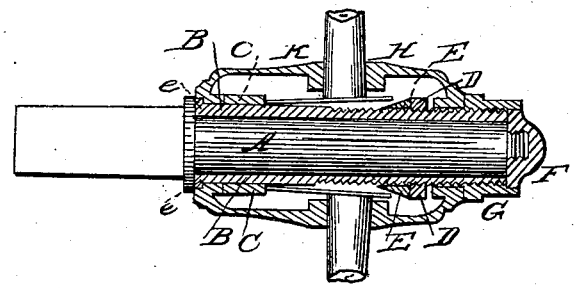
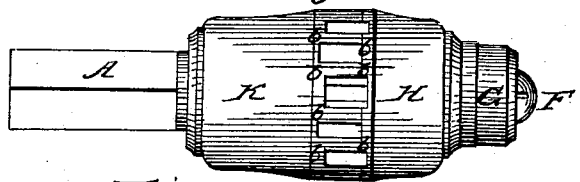
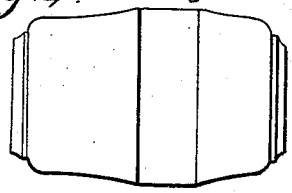
Witnesses:
Chas. C. Wilson.
Henry K. Myggatt.
Inventor:
J. L. Van Wert
by Gardner & Hyde
Attorneys

United States Patent Office.

JAMES L. VAN WERT, OF TOLLAND, MASSACHUSETTS.

Letters Patent No. 111,703, dated February 7, 1871.

IMPROVEMENT IN HUBS FOR WHEELS.

The Schedule referred to in these Letters Patent and making part of the same.

I, JAMES L. VAN WERT, of Tolland, county of Hampden, Commonwealth of Massachusetts, have invented a new and improved Hub for wheels, of which the following is a specification.

My invention relates to an improved form of hub, so constructed that the spokes can be inserted in the rim first, and then in the hub, thus obviating the necessity of taking the rim apart and resetting the tire whenever one or more of the spokes become broken; also, arranging beneath each spoke a strip attached to a ring which is fastened to the box, the said strips being driven out against the ends of the spokes by means of a wedge, operated by a nut, working on the box, for the purpose of tightening the spokes in the wheel, thus rendering it unnecessary to reset the tire.

In the drawing—

Figure 1 shows a general sectional view of my invention.

Figure 2 shows a detail view of the arrangement for extending the spokes.

Figure 3 shows an exterior view of the hub complete.

Figure 4 shows a slightly-different arrangement of my invention, wood being used instead of iron in some parts of the hub.

A is the axle.

B is the box.

C, the ring, having strips, *a a a*, attached to it.

D is the nut for driving the circular wedge E beneath the strips *a*.

F is the nut for holding the box on the axle.

G is the nut for holding together the two parts H K of the hub.

I will first describe my improvement in the body of the hub. I form it of two parts, H K, provided with recesses, *b b b*, in each part, for the reception of the ends of the spoke, and, by this arrangement, if one of the spokes becomes broken another can be inserted without disturbing the rim or tire. These two parts H K are fastened together upon the box B by the nut G, before mentioned.

I vary the construction of this hub, in some cases, by the introduction of wood in place of metal, as shown in fig. 4; also, I arrange the ring C, keyed to the box B or to the hub, and having strips, *a, a*, &c., attached to it, which pass under each spoke, and are forced outward against the ends of the spokes by the circular wedge E, operated by the nut D, by which means the rim and tire may be tightened or relaxed.

By this means, also, I obviate the necessity of constructing the spokes with shoulders bearing against the outside of the hub, and, by doing away with the shoulder, I am able to use a larger tenon in the hub, thus increasing the strength of the wheel.

In putting the hub together the spokes are partially inserted in the recesses *b, b,* &c., and the opposite part of the hub is placed on the box, and the nut G being screwed down upon it, the spokes are driven into the recesses, and the parts H K of the hub come together, forming a solid hub around the spokes. The nut G, when the parts are secured together, forms a part of the end of the hub.

I arrange the box B within the hub, as shown, and provided with a shoulder, *e*, which sinks into a counter-boss in the end of the hub, and is prevented from turning by a key, which is driven into the hub.

Upon screwing up the nut G against the part H the part K brings up against the shoulder *e* on the box, thus forming a solid hub and box combined.

I claim—

1. The ring C, provided with strips, *a, a*, in combination with the nut F and wedge E, operating substantially in the manner and for the purpose set forth.

2. In combination with the first clause of claim, the two parts H K, recesses *b, b,* &c., box B and nut G, the parts all being constructed substantially as shown and described.

J. L. VAN WERT.

Witnesses:
J. B. GARDINER,
R. F. HYDE.